UNITED STATES PATENT OFFICE.

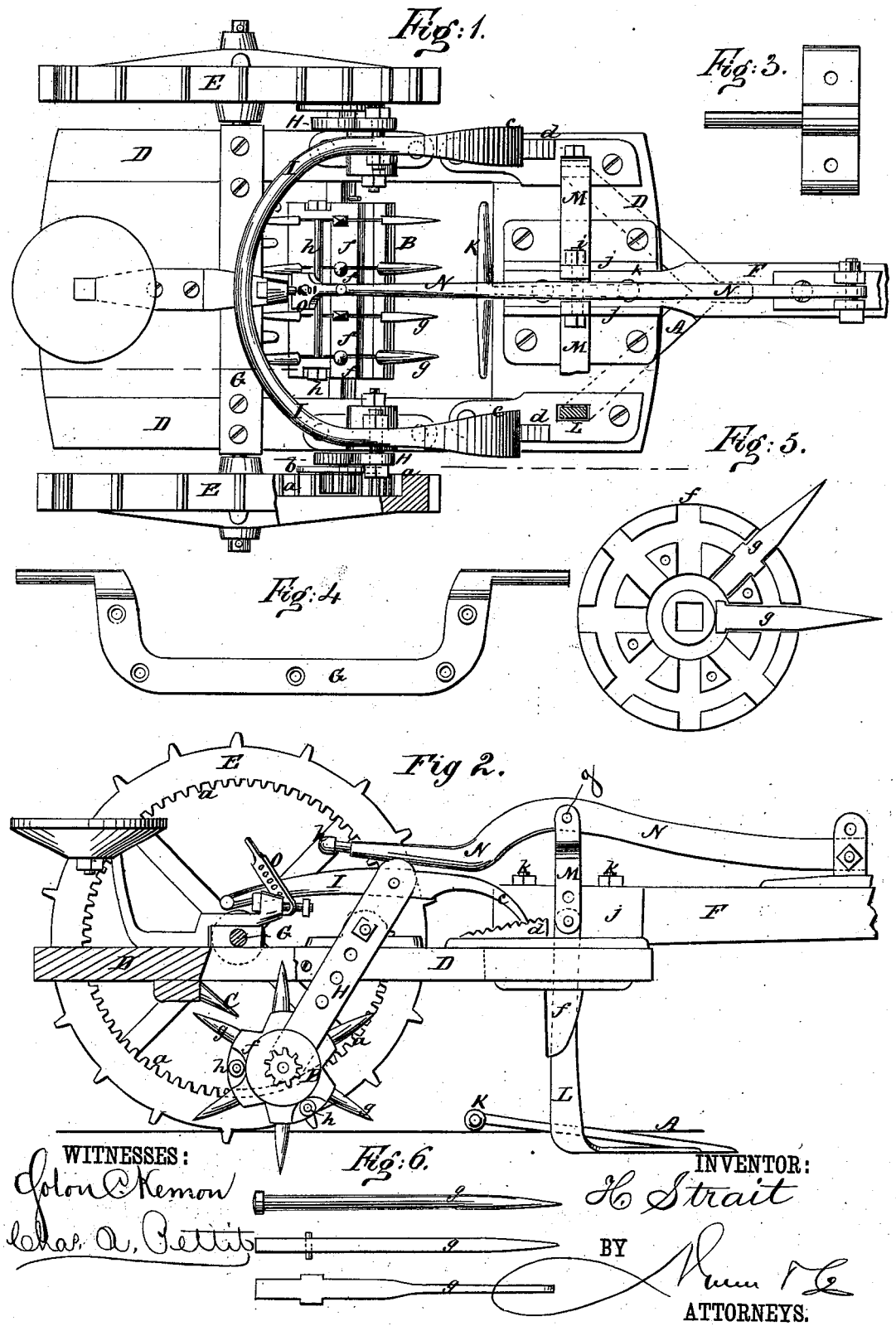

HIRAM STRAIT, OF TROY, NEW YORK.

IMPROVEMENT IN POTATO-DIGGERS.

Specification forming part of Letters Patent No. 210,061, dated November 19, 1878; application filed April 25, 1878.

*To all whom it may concern:*

Be it known that I, HIRAM STRAIT, of Troy, in the county of Rensselaer and State of New York, have invented a new and Improved Potato-Digger; and I do hereby declare that the following is a full, clear, and exact description of the same.

This invention is an improvement in the class of potato-diggers in which the soil is opened by a share and the tubers are separated from the soil and thrown out upon the surface thereof by vibrating or otherwise movable fingers.

I will proceed to describe the construction and arrangement of parts I adopt, reference being had to the accompanying drawing, in which—

Figure 1 is a plan view, and Fig. 2 a sectional elevation, of my improved machine. Figs. 3, 4, 5, 6 represent details.

The vertically-adjustable share A, toothed rotary digger B, and fixed comb C, formed of rigid or flexible teeth, are attached, by means hereinafter described, to a frame, D, which is supported by wheels E, and provided with a tongue, F, which is pivoted as hereinafter described. Said wheels E are mounted loose on the journals of axle G, which may be straight, as represented in Fig. 1, or curved, as in Fig. 4, or otherwise constructed, if found desirable. The wheels have internally-toothed rims $a$, with which mesh the pinions $b$, fixed on the axis of digger B, so that when the wheels rotate a rapid rotation will be imparted to the digger. The latter is suspended horizontally in bars H, pivoted to the sides of the frame D and projecting above the same. These bars H serve as levers to throw the pinions on the rotary digger-shaft into or out of gear with the wheels E. For this purpose a curved or semicircular lever, I, is pivoted to the upper ends of the levers H, and the ends of the same are bent downward to form claws or pawls $c$, which engage the toothed blocks or inclines $d$ fixed on frame D. The curved middle portion of the lever extends back into such proximity to the driver's seat that he may conveniently seize and operate it. When the lever is drawn toward the driver's seat it will cause the bars H to assume a nearly vertical position and throw the pinions $b$ into mesh with the toothed rims $a$. The pawl ends $c$ of the lever I will simultaneously engage the toothed inclines $d$, and thus hold the bars H locked in that position, so that the digger will be caused to rotate as the machine advances. By depressing the rear end of lever I its pawl ends $c$ are disengaged from inclines $d$, and by pushing it (I) forward horizontally the bars H will be swung on their pivots, and the rotary digger thereby raised and thrown out of action. The digger is held in that position by the same means; but the pawls $c$ in that case rest on and engage the upper or raised portion of the toothed inclines $d$.

The share A is a sharp-edged bar of triangular form, having a raised T-shaped rear extension or horn, K. The share has vertical arms L, which slide in suitable sockets attached to frame D, and having downwardly-extended arms $f$ to brace the arms of the share when the machine is in operation. A pivoted yoke or stirrup, M, connects the arms L with the long lever N, which has its fulcrum at $g$ on the tongue F, and extends back far enough to allow the driver easy access to it. By raising or lowering the rear end of this lever N, it is obvious the share A and its attachment or horn K will be adjusted correspondingly, so that it will be caused to enter the soil at greater or less depth, or else raised above it. To hold the share fixed in one position, I lock the lever N by means of a latch-bar, O, pivoted in front of the driver's seat. The rear end of the lever is reduced to form a neck and head, $h$, and the latch-bar has perforations to receive the same, so that the two may be held engaged without an auxiliary device.

The comb C is composed of a series of fixed parallel teeth, set inclined forward and downward, and in such relation to the teeth of the digger that they will pass between them as the latter rotates. The function of the comb is to clear the digger of vines or other trash adhering to it.

The general operation of the machine may be briefly stated thus: The lever I is first drawn back to cause engagement of pinions $b$ with the rims $a$ of the transporting-wheels, and the lever N secured in the proper adjustment to cause the share to enter the soil. The machine being then put in motion, the share will shave off the hills in which the potatoes lie—that is to say, it will divide the soil on a horizontal plane beneath the potatoes. The T-horn K, immediately following the share, will further loosen the soil and dislodge the potatoes from their bed, and also detach the vines. The digger, which is rapidly rotated, will separate or remove all the potatoes from the soil and discharge them straight backward in rear of the machine. The comb C clears the digger-teeth of vines and other trash adhering to them, so that the digger will continue to operate without obstruction so long as the machine advances.

If the potatoes lie deeply bedded in the soil, the digger requires to be set lower, and higher if they are covered at a less depth. To provide for this adjustment of the digger the bars H are perforated with a series of holes, so that their fulcra or pivotal points may be changed as required.

The digger is composed of a series of plates or disks, $f$, which may have either a notched or circular edge, but are recessed or grooved on their faces to form sockets to receive the heads or shanks of the teeth $g$, as shown in Fig. 5. These several plates or disks are secured together, so as to tightly clamp the teeth between them, by means of the long screw bolts or rods $h$, Fig. 1. The disks fit on a polygonal shaft, and hence revolve with it; but by loosening the bolts $h$ the plates may be easily separated to permit removal of the teeth, when required for any purpose. The form of the teeth $g$ may be varied, as illustrated in Fig. 6.

The tongue F requires to be set at different angles to the frame D, according to the height of the team, in order that the frame may run as nearly level as possible. To this end the tongue is pivoted on a transverse bolt, $i$, between two parallel plates or brackets, $j$, fixed to the frame. Adjusting screw-bolts $k$ pass through the tongue in front and rear of the pivot-bolt $i$, and serve to adjust the angle of the tongue and hold it fixed in any adjustment.

It is obvious that, in place of being polygonal, the digger-shaft may be round and the disks $f$ keyed thereon.

I propose in some cases to so construct the body of the digger that the teeth $g$ may be screwed into sockets.

I do not claim, broadly, adjusting a share vertically and holding it fixed when adjusted by means of a lever and ratchet-bar; nor do I claim, broadly, a notched disk keyed on an axle, and having teeth secured thereto by means of bolts.

What I claim is—

1. The combination, substantially as described, of the share and its T-horn, the yoke pivoted to arms L, the pivoted lever extending back to the driver's seat, and the perforated and swiveled latch-bar, all constructed and arranged as shown and described.

2. The combination, substantially as described, of the rotary digger, pinions, and toothed wheel-rims $a$, the pendent swinging arms in which it is journaled, the curved pawl-lever pivoted to said arms, and the toothed inclines, for the purpose of throwing the digger into or out of action and holding it fixed in either position, as specified.

3. The combination of the vertically-adjustable share and its attached T-horn, the digger, the bars H, having a series of perforations to permit vertical adjustment, and the levers N I for operating the share and digger, as shown and described.

4. In combination with the frame D and plates $j$, the tongue F, the transverse pivot-bolt, and the vertical adjusting-screws in front and rear of said pivot-bolt, as shown and described, for the purpose specified.

HIRAM STRAIT.

Witnesses:
EZRA R. VAIL,
WM. W. ROUSSEAU.